(12) United States Patent
Alqahtani (10) Patent No.: US 11,246,683 B1
(45) Date of Patent: Feb. 15, 2022

(54) ORTHODONTIC BAND ATTACHMENT DEVICE

(71) Applicant: King Abdulaziz University, Jeddah (SA)

(72) Inventor: Hamad Alqahtani, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/503,460

(22) Filed: Oct. 18, 2021

(51) Int. Cl.
*A61C 7/36* (2006.01)
*A61C 7/16* (2006.01)

(52) U.S. Cl.
CPC . *A61C 7/36* (2013.01); *A61C 7/16* (2013.01)

(58) Field of Classification Search
CPC .... A61C 7/06; A61C 7/10; A61C 7/12; A61C 7/14–16; A61C 7/36
USPC .......................................................... 433/8, 9
See application file for complete search history.

(56) References Cited

U.S. PATENT DOCUMENTS

| | | | | |
|---|---|---|---|---|
| 4,193,195 | A * | 3/1980 | Merkel | A61C 7/12 433/13 |
| 4,386,908 | A * | 6/1983 | Kurz | A61C 7/145 433/8 |
| 5,993,207 | A * | 11/1999 | Spencer | A61C 7/282 433/18 |
| 2002/0182559 | A1* | 12/2002 | Kamisugi | A61C 7/14 433/9 |
| 2008/0286711 | A1 | 11/2008 | Corcoran et al. | |
| 2010/0092905 | A1* | 4/2010 | Martin | A61C 7/00 433/18 |

(Continued)

FOREIGN PATENT DOCUMENTS

| | | |
|---|---|---|
| CN | 209203565 U | 8/2019 |
| JP | 3143053 U * | 7/2008 |

(Continued)

OTHER PUBLICATIONS

"Orthodontic attachment multi-hook monoblock bondable orthodontic lingual button", Denxy Technology Co., Limited, www.denxy.cc/sdm/1265244/4/pd-5609621/20942404-2278696/Orthodontic_attachment_multi-hook_monoblock_bonda.html, May 3, 2021, 4 pages.

(Continued)

*Primary Examiner* — Edward Moran
*Assistant Examiner* — Matthew P Saunders
(74) *Attorney, Agent, or Firm* — Oblon, McClelland, Maier & Neustadt, L.L.P.

(57) ABSTRACT

An orthodontic band attachment device used for an orthodontic procedure is described. The device includes a base having a tooth interfacing surface and an outer base surface. The device further includes a button support column attached to the outer base surface, and a button structure attached to the button support column such that an inner button surface is separated from the outer base surface by a button support column height. The device further includes a hook arm attachment member attached to the base at a substantially peripheral location and a hook arm comprising one or more band attachment structures arranged along a hook arm length. The hook arm attachment member is oriented such that a hook arm outer surface is substantially coplanar with an outer button surface and an orthodontic band is able to pass between the hook arm attachment member and the button structure.

18 Claims, 6 Drawing Sheets

(56) References Cited

U.S. PATENT DOCUMENTS

| | | | |
|---|---|---|---|
| 2010/0178628 A1* | 7/2010 | Kim | A61C 7/145 |
| | | | 433/10 |
| 2014/0335468 A1* | 11/2014 | Dickerson | A61C 7/36 |
| | | | 433/19 |
| 2016/0199152 A1 | 7/2016 | Kim | |
| 2018/0193110 A1* | 7/2018 | Crouse | A61C 7/12 |
| 2019/0274788 A1 | 9/2019 | Cetta et al. | |
| 2020/0146782 A1* | 5/2020 | Cope | A61C 7/141 |
| 2020/0163743 A1* | 5/2020 | Chen | A61C 7/36 |

FOREIGN PATENT DOCUMENTS

| | | | | |
|---|---|---|---|---|
| JP | 3143053 U | | 7/2008 | |
| KR | 100692646 B1 | * | 3/2007 | |
| KR | 100773150 B1 | * | 11/2007 | |
| KR | 101404496 B1 | * | 6/2014 | |
| WO | WO 2014/129752 A1 | | 8/2014 | |
| WO | WO-2014129752 A1 | * | 8/2014 | A61C 7/16 |

OTHER PUBLICATIONS

"Bondable Multi-Hook Buttons", Hangzhou Xingchen 3B Dental Instrument & Material Co. Ltd., www.ortho3b.com/en/productdetail.aspx?p_id=186, 2020, 2 pages.

* cited by examiner

ORTHODONTIC BAND ATTACHMENT DEVICE

STATEMENT OF ACKNOWLEDGEMENT

The inventors extend their appreciation to the Deputyship for Research and Innovation, Ministry of Education in Saudi Arabia for funding this research work through the project number 2020-025 and King Abdulaziz University, DSR, Jeddah, Saudi Arabia.

BACKGROUND

Technical Field

The present disclosure is directed to a dental appliance, and particularly, to an orthodontic band attachment device used to attach orthodontic elastics in different configurations during orthodontic procedure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Orthodontic procedures are performed to diagnose, prevent and correct abnormal alignment of teeth and jaws. Such procedures typically involve use of orthodontic braces and other appliances such as orthodontic tubes to correct abnormalities in the teeth and jaws. Orthodontic hooks and buttons have been used in orthodontic field for many years. Buttons are valuable adjunct in orthodontic treatment, and they can be used in managing vertical tooth positions, rotations, and anteroposterior corrections of occlusion when used with other orthodontic devices such as bands, brackets, clear orthodontic aligners, or lingual braces. Orthodontic buttons can be applied to the teeth in any surface. Hooks are usually made of metal, and attached directly to the tooth or they can be crimped or spot welded or soldered into main orthodontic archwire. Hooks can be used in orthodontic mechanics to help in teeth retraction to correct anteroposterior relation, close spaces, correct teeth flaring, and reduce the overjet. This is called an en-mass retraction method which involves soldered or crimpable hooks between the lateral incisor and canine on archwires. Hooks and buttons can be used as an anchor for inter-arch and intra-arch elastics to achieve certain dental movements. Hooks can be attached directly to teeth adjacent to extraction site in clear aligner therapy. They can help plastic aligners in space closure mechanics by moving the applied force close to the center of rotation of adjacent teeth. Thus, this facilitates bodily movement of the teeth. Crimpable hooks on orthodontic archwires can be used for intermaxillary fixation during orthognathic treatment.

Orthodontic movement and forces change consistently during orthodontic treatment. Orthodontists might prescribe different orthodontic elastics in different configurations depending on planned orthodontic movements. For example, during space closure in extraction cases, forces applied through brackets are away from the center of rotation of the teeth which is not helpful in space closure to aid in roots movement. Orthodontic hooks, however, can be bonded directly to the cervical portion of the teeth to allow elastics to be anchored close to the center of rotation of the teeth close to extraction site to allow root movement during space closure. This approach is very helpful in case of orthodontic clear aligner therapy. Sometimes, different elastic configurations need to be used on the same teeth. These different elastic configurations can require multiple hook positions and/or a hook for one configuration and a button for another configuration. Having to remove a first orthodontic device and either move it or replace it with a second device can be costly, time-consuming, and cause a patient increased discomfort or increased risk of complications. A single device which can be used as both a button and a hook would be advantageous over, for example, first placing hooks, then later having those hooks removed and replaced with buttons. Hence, there is a need remains to develop an orthodontic band attachment device having both button and hook functionalities to overcome the limited capabilities of using button or hook separately.

US20080286711A1 relates to an orthodontic hook device secured to an orthodontic archwire. The device includes a base member made to slidably received on an archwire secured to the dental arch and a hook member extends out of the base member. The hook member includes a first edge and a second edge, which have variable configurations to attach with biasing members. However, the device of this reference lacks the functionality of a button combined with the hook.

US20100092905A1 relates to an orthodontic power arm having a body with a bonding surface to be attached to tooth surface. A blade-shaped arm extends from the body and equipped with number of recesses in the mesial or distal sides of the arm for engaging with orthodontic elastics to aid in orthodontic movement. However, the power arm disclosed in this reference lacks functionality of button and hook combined with a single device.

US20190274788A1 relates to an orthodontic elastic attachments having a base pad contoured to the dental anatomy of the tooth at the gumline for intimate fit. The elastic attachments include a button head, a button stem connecting the button head to the base pad, and positioning groove on the button head. However, the elastic attachment of this reference does not have the functionality of hook combined with that of the button.

CN209203565U relates to a traction hook having a towing accessory, a bottom plate, and a connecting piece for connecting the accessory and the bottom plate. The towing accessory is parallel to the bottom plate and comprises traction hook and pull hooks disposed on the traction hook. WO2014129752A1 relates to a hook button having a tooth fixing part, a supporting part, a seating part connecting the tooth fixing part and the supporting part, an extension part extending from the supporting part, and protrusions formed on the extension part. However, in both the references CN209203565U and WO2014129752A1, as the hook or the extension part is directly attached to a top end of the connecting piece or the seating part, the amount of force applied to band to engage with the connecting piece or the seating part is high as the band has to be pulled for the entire length of the hook or the extension part just to engage with the connecting piece or the seating part. Further, the force caused by the band attached to the pull hooks or the protrusions and the force caused by the band attached to the connecting piece or the seating part together act on the bottom plate or the tooth fixing part which may impact attachment of the device with the tooth surface and may make the bonding weak over a period of time. Further, such arrangement may place large amounts of torque on the connecting piece or the seating part when the elastic bands or other structures are attached to the hooks. These factors may lead to increased risk of device failure, possibly creating an uncomfortable or dangerous situation for a patient.

Each of the aforementioned patent references suffers from one or more drawbacks which makes their use disadvantageous. Accordingly, it is one object of the present disclosure to provide an orthodontic band attachment device having the functionalities of both hook and button combined to make the device more efficient and increase the safety of, success rate of, and patient experience with orthodontic procedures.

SUMMARY

The orthodontic band attachment device, the Mahawi Orthodontic ButtonHook, includes a base having a tooth interfacing surface and an outer base surface. The orthodontic band attachment further includes a button support column attached to the outer base surface at a substantially central location. The button support column has a button support column diameter which is smaller than an outer base surface size and a button support column height. The orthodontic band attachment device further includes a button structure having a button structure diameter which is greater than the button support column diameter, an outer button surface which is substantially parallel to the outer base surface, and an inner button surface which is attached to the button support column such that the inner button surface is separated from the outer base surface by the button support column height. The orthodontic band attachment device further includes a hook arm attachment member attached to the base at a substantially peripheral location, and a hook arm comprising one or more band attachment structures arranged along a hook arm length and having a hook arm outer surface and a hook arm inner surface. The hook arm attachment member is oriented such that the hook arm outer surface is substantially coplanar with the outer button surface and an orthodontic band is able to pass between the hook arm attachment member and the button structure.

In some embodiments, the tooth interfacing surface is concave.

In some embodiments, the tooth interfacing surface is contoured to interface securely with a tooth surface.

In some embodiments, the tooth interfacing surface has an adhesive accommodating texture.

In some embodiments, the base is substantially circular.

In some embodiments, the button structure diameter is greater than the button support column diameter so as to create a button overhang distance of at least 0.25 mm.

In some embodiments, the button support column height is at least 0.5 mm.

In some embodiments, the hook arm attachment member is oriented at a hook arm attachment member angle of 30 to 60 degrees with respect to the outer base surface.

In some embodiments, the hook arm is oriented at a hook arm angle of 30 to 60 degrees with respect to the hook arm attachment member.

In some embodiments, the band attachment structure comprises a band attachment projection. The band attachment projection has a band attachment projection inner surface and a band attachment projection outer surface.

In some embodiments, the band attachment projection is oriented substantially perpendicular to the hook arm and substantially coplanar with the outer button surface and the hook arm outer surface.

In some embodiments, the band attachment projection further comprises a band securing projection attached to the band attachment projection at a location distal to the hook arm and which extends in a direction toward the button structure.

In some embodiments, the band securing projection is oriented substantially parallel to the hook arm.

In some embodiments, the band attachment structure comprises a band attachment indentation extending into the hook arm which defines a band attachment gap.

In some embodiments, the band attachment indentation is oriented substantially perpendicular to the hook arm and extends no further than 75% of a hook arm width.

In some embodiments, the band attachment indentation further comprises a band securing projections which is substantially coplanar with a side surface of the hook arm and which extends in a direction toward the button structure.

In some embodiments, outer button surface and the hook arm outer surface are convex.

In some embodiments, the band attachment projection outer surface is convex.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to the Mahawi Orthodontic ButtonHook, an orthodontic band attachment device having a button structure with a hook arm used as an adjunctive aid for orthodontic treatment. The Mahawi Orthodontic ButtonHook includes a circular base having a tooth interfacing surface with a texture or pattern to accommodate adhesive and thereby to securely interface the device with a tooth surface. A button support column extends from the base to attach with the button structure. From the base, the hook arm extends gingivally, offset to keep the hook arm away from the gingiva to allow for self-cleansing, less irritation of the gum, and easy insertion of orthodontic elastics. The hook arm has one or more band attachment structures to engage orthodontic bands.

Figure 1:
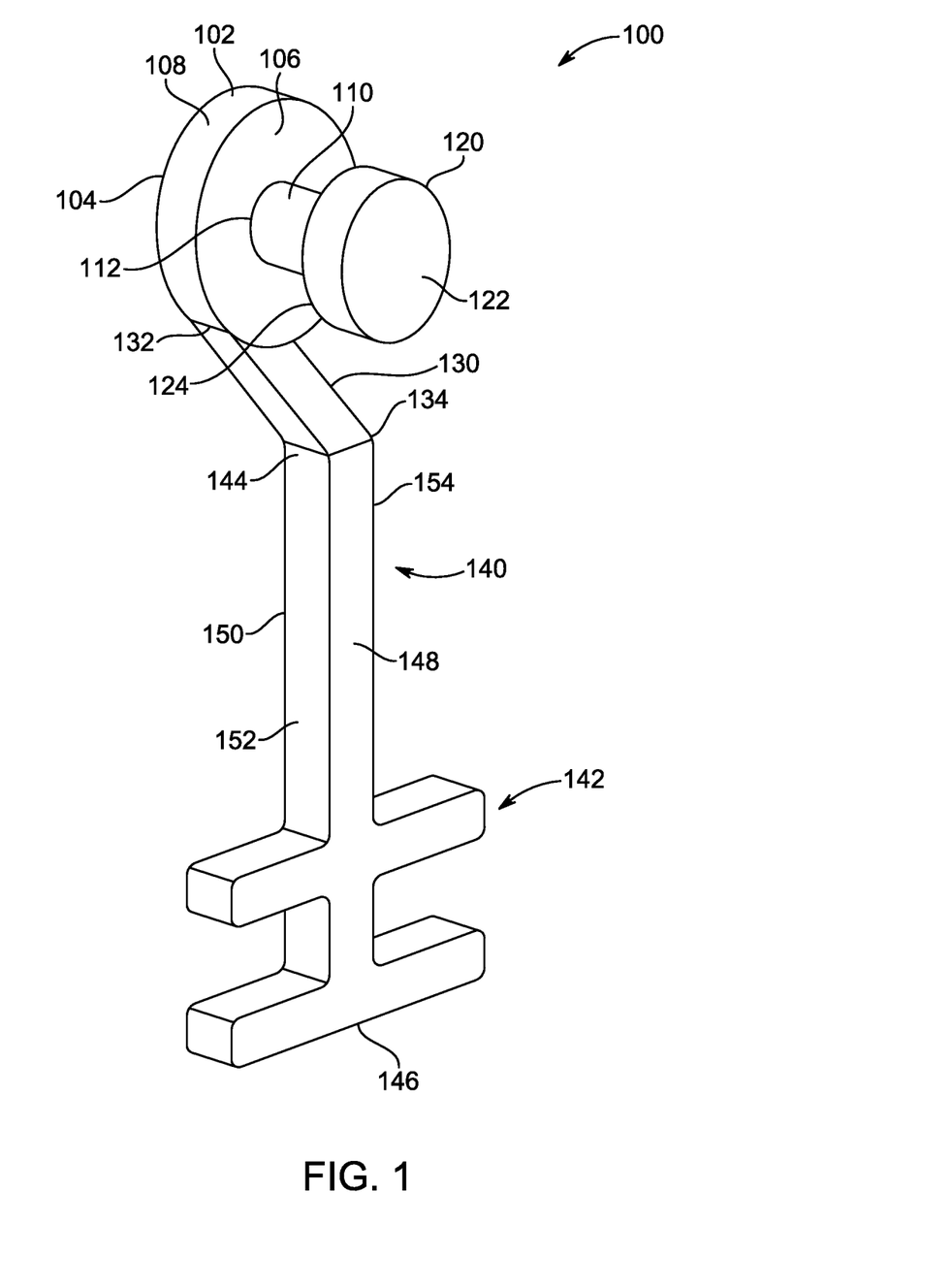
FIG. 1 is a perspective view of an orthodontic band attachment device, according to certain embodiments.

Referring to FIG. 1, a perspective view of an orthodontic band attachment device 100 is illustrated. The orthodontic band attachment device 100 is used to attach orthodontic bands in different configurations during an orthodontic procedure. The orthodontic procedure is generally performed to diagnose, prevent, or correct abnormal alignment of teeth and thereby to avoid incorrect bite situations. The orthodontic band attachment device 100 includes a base 102 having a tooth interfacing surface 104, an outer base surface 106, and an annular side surface 108 extending between the tooth interfacing surface 104 and the outer base surface 106. The tooth interfacing surface 104 may be referred to as a surface of the base 102 that is configured to attach with a tooth surface, which is otherwise known as a facial surface of a tooth, and the outer base surface 106 is distal to the tooth interfacing surface 104. The orthodontic band attachment device 100 further includes a button support column 110 attached to the outer base surface 106 at a substantially central location. The button support column 110 has a cylindrical shape having a first column end 112 attached to the outer base surface 106. The button support column 110 has a button support column height 'H' (shown in FIG. 2) defined between the first column end 112 and a second column end 114 (shown in FIG. 2) thereof. The orthodontic band attachment device 100 further includes a button structure 120 attached to the second column end 114 of the button support column 110. Particularly, the button structure 120 has an outer button surface 122 substantially parallel to the outer base surface 106 and an inner button surface 124 that is attached to the second column end 114 of the button support column 110, such that the inner button surface 124 is separated from the outer base surface 106 by the button support column height 'H'. In some embodiments, the outer button surface 122 is convex.

The orthodontic band attachment device 100 further includes a hook arm attachment member 130 attached to the base 102 at a substantially peripheral location. The hook arm attachment member 130 includes a first attachment end 132 attached to the annular side surface 108 of the base 102 and a second attachment end 134 distal to the first attachment end 132. In some embodiments, the hook arm attachment member 130 may be attached to a peripheral edge of the base 102 defined by the outer base surface 106. In one embodiment, the first attachment end 132 of the hook arm attachment member 130 may be integrally attached to the base 102. In some embodiments, the first attachment end 132 of the hook arm attachment member 130 may be detachably attached to the annular side surface 108 of the base 102 using a press fit mechanism, a snap fit mechanism, or any other mechanisms known in the art.

The orthodontic band attachment device 100 further includes a hook arm 140 attached to the hook arm attachment member 130. The hook arm 140 has one or more band attachment structures 142 disposed between a first arm end 144 and a second arm end 146 thereof to hold one or more orthodontic bands. The hook arm 140 has a rectangular cross-section having a hook arm outer surface 148 and a hook arm inner surface 150 substantially parallel to each other. In some embodiments, the hook arm outer surface 148 is convex. The hook arm 140 further includes a first side surface 152 and a second side surface 154 distal to the first side surface 152. In some embodiments, the hook arm 140 may have a circular cross-section, an oval cross-section, or a cross-section having any other polygon shape with rounded edges and corners. Such rounded edges and corners may be advantageous for reducing tissue irritation which may be caused by contact with a device, particularly a device with sharp edges and corners. The hook arm 140 and the hook arm attachment member 130 are oriented and connected to the base 102 in such a way that the hook arm outer surface 148 is substantially coplanar with the outer button surface 122 of the button structure 120 and the one or more orthodontic bands are able to pass between the hook arm attachment member 130 and the button structure 120. This coplanar nature is visible in FIG. 2.

The configuration of the orthodontic band attachment device 100 having the hook arm 140 attached to the base 102 using the hook arm attachment member 130 allows the stresses caused by the orthodontic bands around the button support column 110 and the orthodontic bands around the hook arm 140 to act on different structural members such that overall stress applied to a single member may be lowered. Further, a gap between the button structure 120 and the hook arm attachment member 130 makes the process of securing the orthodontic band around the button support column 110 easier. Further, the orthodontic band attachment device 100 allows the orthodontic bands to pass over only the button structure 120 to secure around the button support column 110 and thus eliminate the need to pass the entire length of the hook arm 140 as seen in the known system. The orthodontic band does not need to travel all the way around the second arm end 146 to be installed or removed. Thus, the orthodontic band attachment device 100 of the present disclosure is advantageous for user experience, ease of use, and reducing risk of orthodontic bands failure as the degree of stretching required is smaller compared to known systems.

Figure 2:
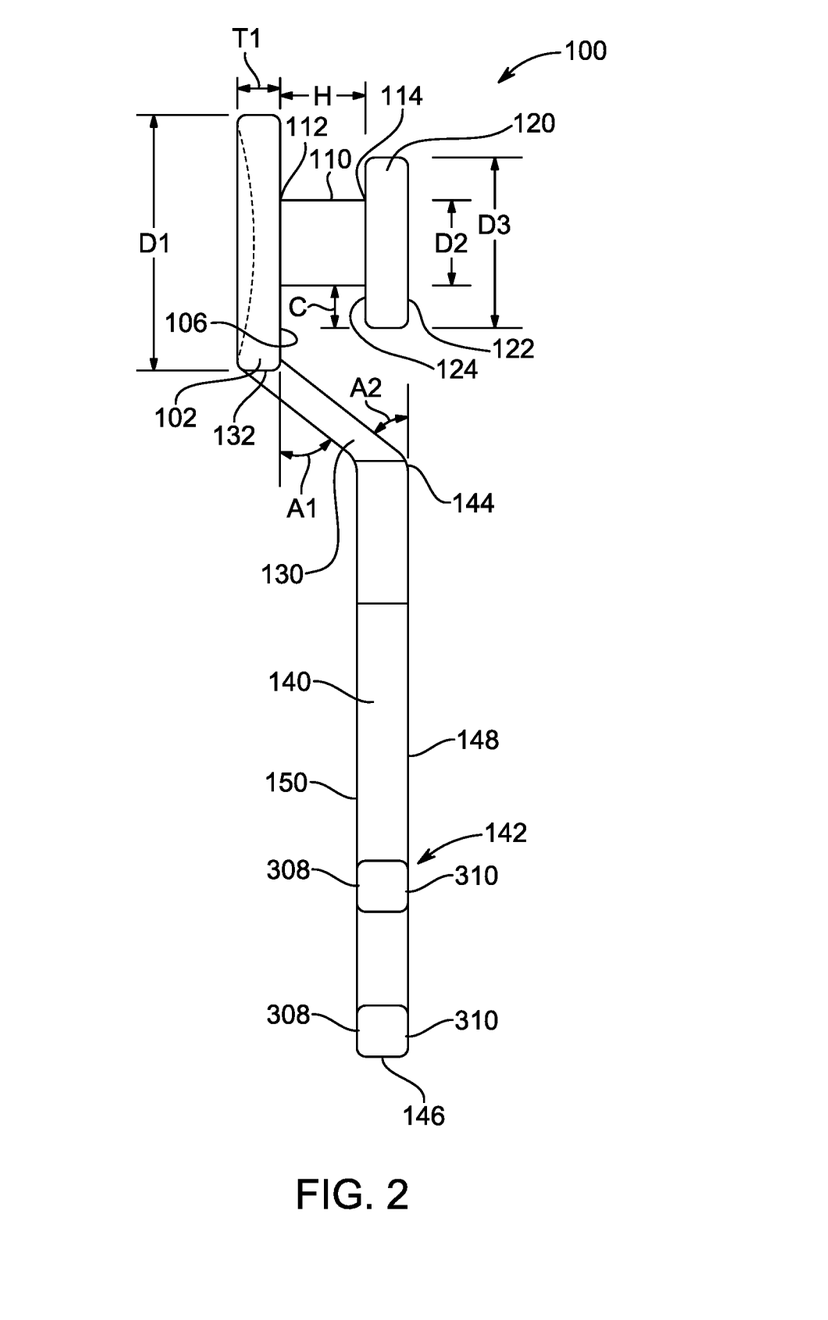
FIG. 2 is a side view of the orthodontic band attachment device, according to certain embodiments.

Referring to FIG. 2, a side view of the orthodontic band attachment device 100 is illustrated, according to certain embodiments. Referring to the exemplary embodiments depicted in FIG. 1 and FIG. 2, the base 102 is substantially circular and has a base diameter 'D1' and a base thickness 'T1'. The base diameter 'D1' and the base thickness 'T1' may be defined based on various factors including, but not limited to, a size of a tooth of an adult patient and material of the base 102. In some embodiments, the base 102 may have an oval shape, or a polygon shape with rounded edges and corners to provide comfort to patient during the orthodontic procedure. Different shapes of the base 102 may be intended for use with different teeth, e.g. a "molar shape", an "incisor shape", a "canine shape", and/or a "bicuspid shape". It is envisioned that there can be different sizes of the device. For example, there may be a smaller device intended for use in children (a "pediatric size" or "pediatric device"). There may be a larger device intended for use in adults (an "adult size" or "adult device"). There may be different sizes intended for use with different teeth, e.g. a "molar size", an "incisor size", a "canine size", and/or a "bicuspid size". In one example, the base diameter 'D1' may be 3.0 mm and the base thickness 'T1' may be 0.5 mm.

The button support column 110 is centrally located on the outer base surface 106 of the base 102 and has a button support column diameter 'D2' and the button support column height 'H'. The button support column diameter 'D2' is smaller than an outer base surface size, which is otherwise referred to as the base diameter 'D1'. In an example, the button support column diameter 'D2' is 1.0 mm. The inner button surface 124 of the button structure 120 is attached to the second column end 114 of the button support column 110 such that the inner button surface 124 is separated from the outer base surface 106 of the base 102 by the button support column height 'H'. In an embodiment, the button support column height 'H' is at least 0.5 mm. In some embodiments, the button support column height 'H' is in a range of 0.5 mm to 1.5 mm, preferably 0.75 to 1.25 mm. In an example, as shown in FIG. 2, the button support column height 'H' is 1.0 mm.

The button structure 120 attached to the second column end 114 of the button support column 110 has a circular shape having a button structure diameter 'D3' greater than the button support column diameter 'D2' and less than the base diameter 'D1'. In an example, the button structure diameter 'D3' is 2.0 mm. In some embodiments, the button structure 120 may have an oval shape, or a polygon shape with rounded edges and corners to provide comfort to the patient during the orthodontic procedure. The button structure diameter 'D3' is greater than the button support column diameter 'D2' so as to create a button overhang distance 'C' of at least 0.25 mm. The button overhang distance 'C' may be defined as a distance measured between a peripheral edge of the button structure 120 and an outer periphery of the button support column 110 along a radial direction.

The first attachment end 132 of the hook arm attachment member 130 is attached to the base 102 in such a way that the hook arm attachment member 130 is oriented at a hook arm attachment member angle 'A1' of 30 to 60 degrees, preferably 32.5 to 57.5 degrees, preferably 35 to 55 degrees, preferably 37.5 to 52.5 degrees, preferably 40 to 50 degrees, preferably 42.5 to 47.5 degrees with respect to the outer base surface 106 of the base 102. In one example, the hook arm attachment member angle 'A1' may be 45 degrees. Further, the first arm end 144 of the hook arm 140 is attached to the second attachment end 134 of the hook arm attachment member 130 such that the hook arm 140 is oriented at a hook arm angle 'A2' of 30 to 60 degrees, preferably 32.5 to 57.5 degrees, preferably 35 to 55 degrees, preferably 37.5 to 52.5 degrees, preferably 40 to 50 degrees, preferably 42.5 to 47.5 degrees with respect to the hook arm attachment member 130. In one example, the hook arm angle 'A2' is 45 degrees. In some embodiments, the hook arm attachment member angle 'A1' and the hook arm angle 'A2' have substantially the same value. In an example, when the hook arm attachment member angle 'A1' and the hook arm angle 'A2' are 45 degrees, the hook arm outer surface 148 is substantially placed coplanar with the outer button surface 122. Further, the orientation of the hook arm attachment member 130 at the hook arm attachment member angle 'A1' creates a gap between the button structure 120 and the hook arm attachment member 130 and thus allow the orthodontic band to pass through the gap to engage with the button support column 110.

Figure 3:
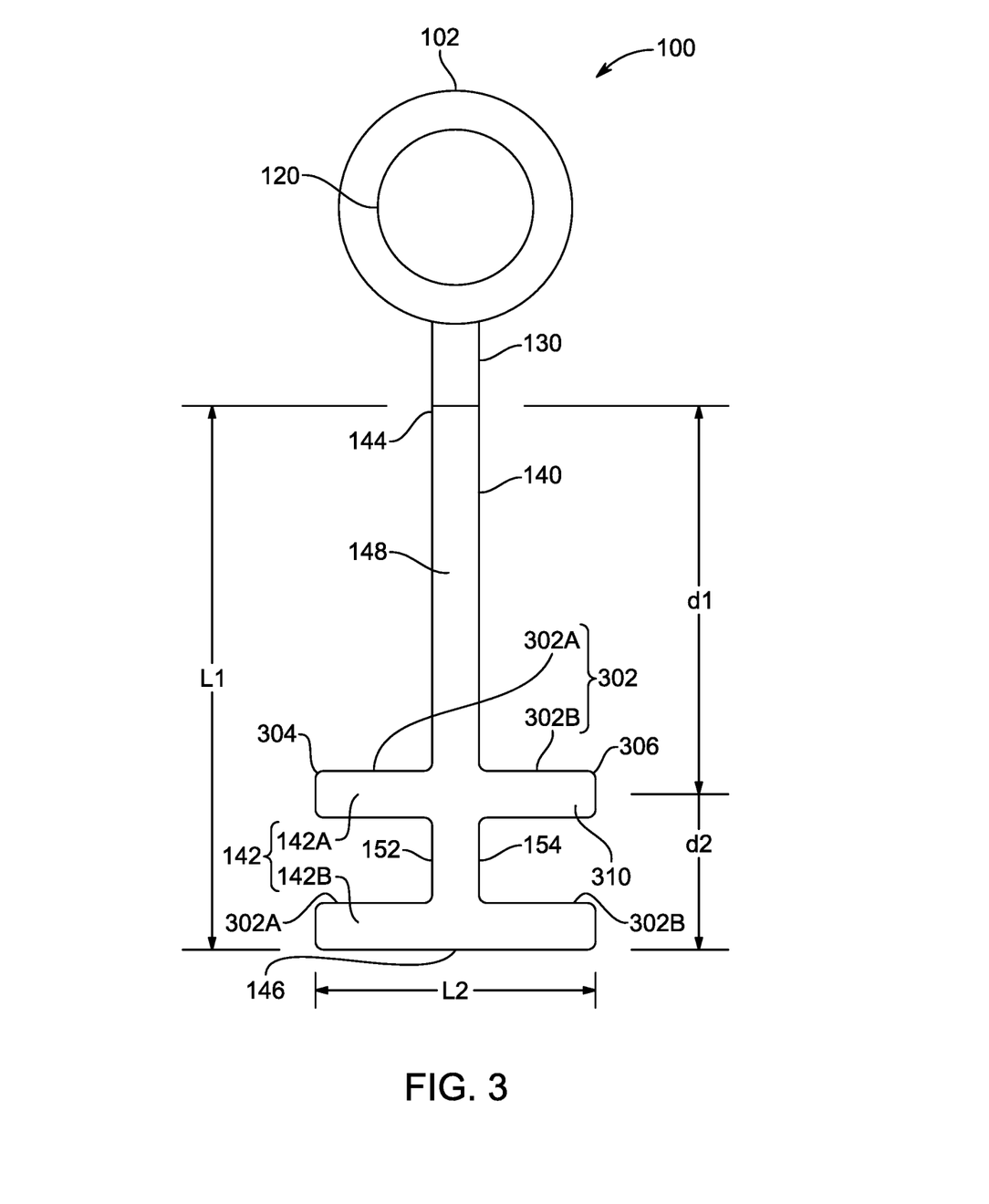
FIG. 3 is a front view of the orthodontic band attachment device, according to certain embodiments.

Referring to FIG. 3, a front view of the orthodontic band attachment device 100 is illustrated, according to certain embodiments. Referring to FIGS. 1 to 3, the hook arm 140 is attached to the base 102 via the hook arm attachment member 130. The hook arm 140 includes the one or more band attachment structures 142 arranged along a hook arm length 1l'. The hook arm 140 is an elongated member having the hook arm length 1l' defined between the first arm end 144 and the second arm end 146. In the exemplary embodiment shown in FIG. 3, the hook arm 140 includes two band attachment structures such as a first band attachment structure 142A and a second band attachment structure 142B. The first band attachment structure 142A and the second band attachment structure 142B are collectively referred to as 'the band attachment structures 142' and individually referred to as 'the band attachment structure 142', unless otherwise specifically mentioned. The first band attachment structure 142A is located at a first distance 'd1' from the first arm end 144 of the hook arm 140 and the second band attachment structure 142B is located at a second distance 'd2' from the first band attachment structure 142A. The first distance and the second distance 'd2' together define the hook arm length 1l'. In one example, the first distance 'd1' is 5.0 mm and the second distance 'd2' is 2.0 mm.

The band attachment structure 142 incudes a band attachment projection 302 oriented substantially perpendicular to the hook arm 140 and substantially coplanar with the outer button surface 122 and the hook arm outer surface 148. The band attachment projection 302 has a projection length l2' defined between a first projection end 304 and a second projection end 306. In an embodiment, the band attachment projection 302 may include a first band attachment projection 302A attached to the first side surface 152 of the hook arm 140 and a second band attachment projection 302B attached to the second side surface 154 of the hook arm 140. In some embodiments, the first band attachment projection 302A and the second band attachment projection 302B may have equal lengths. In some embodiments, the hook arm 140 may include only the first band attachment projection 302A on one side thereof. In some embodiments, the hook arm 140 may include only the second band attachment projection 302B on one side thereof. In some embodiments, the hook arm 140 may include the first band attachment projection 302A and the second band attachment projection 302B orientated perpendicular to the hook arm 140 on a different plane, instead of opposite to each other on a same plane as shown in the FIG. 3. In one example, the length of each of the first band attachment projection 302A and the second band attachment projection 302B is 1.5 mm. In some embodiments, the first band attachment projection 302A and the second band attachment projection 302B may have different lengths. In some embodiments, each of the first band attachment projection 302A and the second band attachment projection 302B may be at an angle with respect to the hook arm 140. This angle may orient the first projection end 304 and/or the second projection end 306 toward the base. Such an angle may be referred to as an "angle of inclination". In one example, the angle of inclination of the first band attachment projection 302A and the second band attachment projection 302B may be equal. In another example, the angle of inclination of each of the first band attachment projection 320A and the second band attachment projection 302B may be different. In some embodiment, the band attachment projection 302 may be an elongated body having the projection length l2' and centrally attached to the hook arm 140 such that length of the band attachment projection 302 may be symmetrical on either side of the hook arm 140.

The band attachment projection 302 includes a band attachment projection inner surface 308 (shown in FIG. 2) and a band attachment projection outer surface 310. The band attachment projection 302 may have a rectangular cross-section having the band attachment projection inner surface 308 and the band attachment projection outer surface 310 substantially parallel to each other. In some embodiments, the band attachment projection 302 may have a circular cross-section, an oval cross-section, or a cross-section of any other polygon shape with rounded edges and corners. In some embodiments, the hook arm 140 may have a rectangular cross-section, circular cross-section, an oval cross-section, or a cross-section of any other polygon shape with rounded edges and corners. In some embodiments, the hook arm 140 and/or the band attachment projection 302 may have a semicircular cross-section such that flat surface may face the teeth and gum while curved surface may face lips and cheeks of the patient. In some embodiments, the cross-section of the band attachment projection 302 may be identical to the cross-section of the hook arm 140. In some embodiments, the cross-section of the band attachment projection 302 may be different from the cross-section of the hook arm 140. In some embodiments, the band attachment projection outer surface 310 is convex. When the band attachment projection 302 is attached to the hook arm 140, the band attachment projection outer surface 310 becomes coplanar with the outer button surface 122 and the hook arm outer surface 148. Further, the band attachment projection inner surface 308 becomes coplanar with the hook arm inner surface 150.

Figure 4:
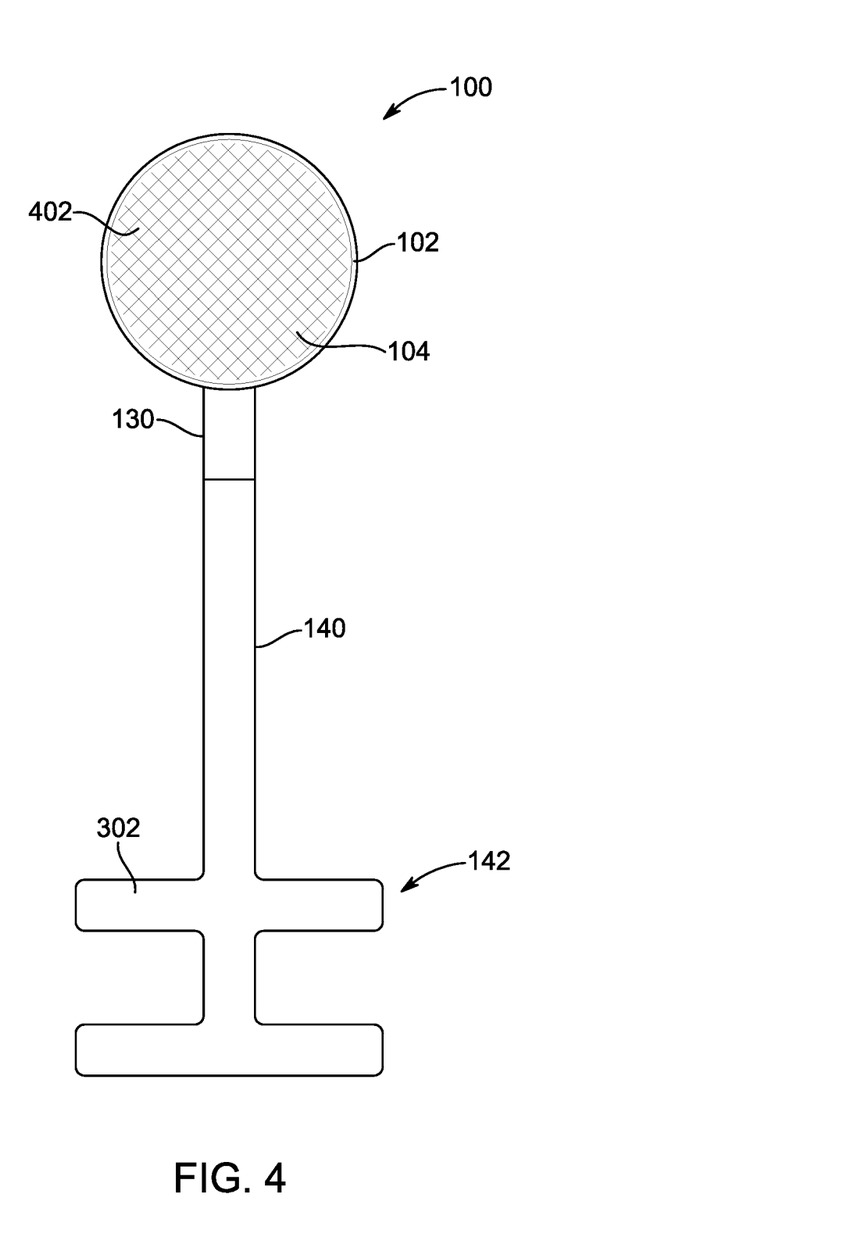
FIG. 4 is a rear view of the orthodontic band attachment device, according to certain embodiments.

Referring to FIG. 4, a rear view of the orthodontic band attachment device 100 is illustrated, according to certain embodiments. The orthodontic band attachment device 100 includes the base 102 having the tooth interfacing surface 104. In some embodiments, the tooth interfacing surface is flat. In some embodiments, the tooth interfacing surface 104 is concave. The tooth interfacing surface 104 can be contoured to interface securely with the tooth surface. The concave shape of the tooth interfacing surface 104 of the base 102 may be designed based on various design parameters including, but not limited to, the base diameter 'D1', the base thickness 'T1', and facial surface of a tooth of an adult patient. The tooth interfacing surface 104 further includes an adhesive accommodating texture 402, which may be otherwise known as a gripping surface. The adhesive accommodating texture 402 may additionally provide a friction in the tooth interfacing surface 104 to firmly and securely interface with the tooth surface. Further, the adhesive accommodating texture 402 may help to retain or hold an adhesive therein to cause firm bonding with the tooth surface. In one example, the adhesive accommodating texture 402 may be formed using a knurling process. In some embodiments, the tooth interfacing surface 104 may have grooves and/or indentations in different configurations to improve retention of the orthodontic band attachment device 100 to the tooth surface. Such grooves and/or indentations may be arranged into a pattern.

In some embodiments, the base 102, the button support column 110, the button structure 120, the hook arm attachment member 130, the hook arm 140, and the band attachment structures 142 may be made of materials such as metals including mixed metals and metal alloys, ceramic, polymers including synthetic polymers, and any other biocompatible material. In an example, the material may include stainless steel, gold-plated stainless steel, nickel-titanium, and titanium. In some embodiments, the elements of the orthodontic band attachment device 100 may be made of same material. In some embodiments, the elements of the orthodontic band attachment device 100 may be made of different materials. In some embodiments, the elements of the orthodontic band attachment device 100 may be manufactured using 3D printing method. In some embodiments, an outer surface of the elements of the orthodontic band attachment device 100 may be coated using material such as ceramic or polymer to improve wear resistance and patient comfort during the orthodontic procedure.

Figure 5:
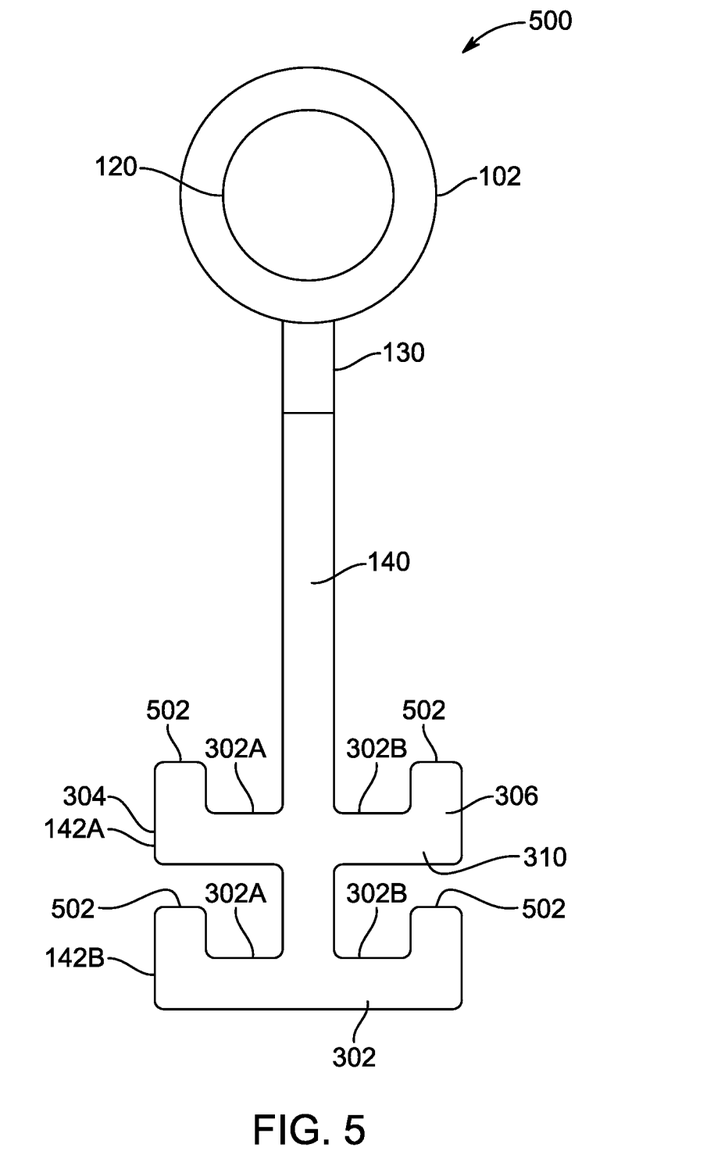
FIG. 5 is a front view of an orthodontic band attachment device illustrating band securing projections, according to certain embodiments.

Referring to FIG. 5, a front view of an orthodontic band attachment device 500 showing band securing projections 502 is described, according to certain embodiments. The orthodontic band attachment device 500 includes the base 102, the button structure 120, the hook arm attachment member 130, the hook arm 140, the band attachment structures 142, and the band attachment projection 302. The band attachment projection 302 includes the band securing projections 502 attached to the band attachment projection 302 at a location distal to the hook arm 140. The band securing projections 502 further extend from the band attachment projection 302 in a direction towards the button structure 120. In an embodiment, the band securing projection 502 is attached to each of the first projection end 304 and the second projection end 306 of the band attachment projection 302. In some embodiments, the band attachment projection 302 and the band securing projection 502 may be an integral component. In some embodiments, the band securing projection 502 may be separately attached to the band attachment projection 302. In some embodiments, the band securing projection 502 may extend perpendicularly from the band attachment projection 302. In some embodiments, the band securing projection 502 may extend from the band attachment projection 302 towards the button structure 120 at an angle. The angle may be defined in such a way that the orthodontic band should not slip out from the band attachment projection 302. The band securing projection 502 is further oriented substantially parallel to the hook arm 140. Particularly, the band securing projection 502 may have an outer surface that is coplanar with the hook arm outer surface 148 and the band attachment projection outer surface 310.

Figure 6:
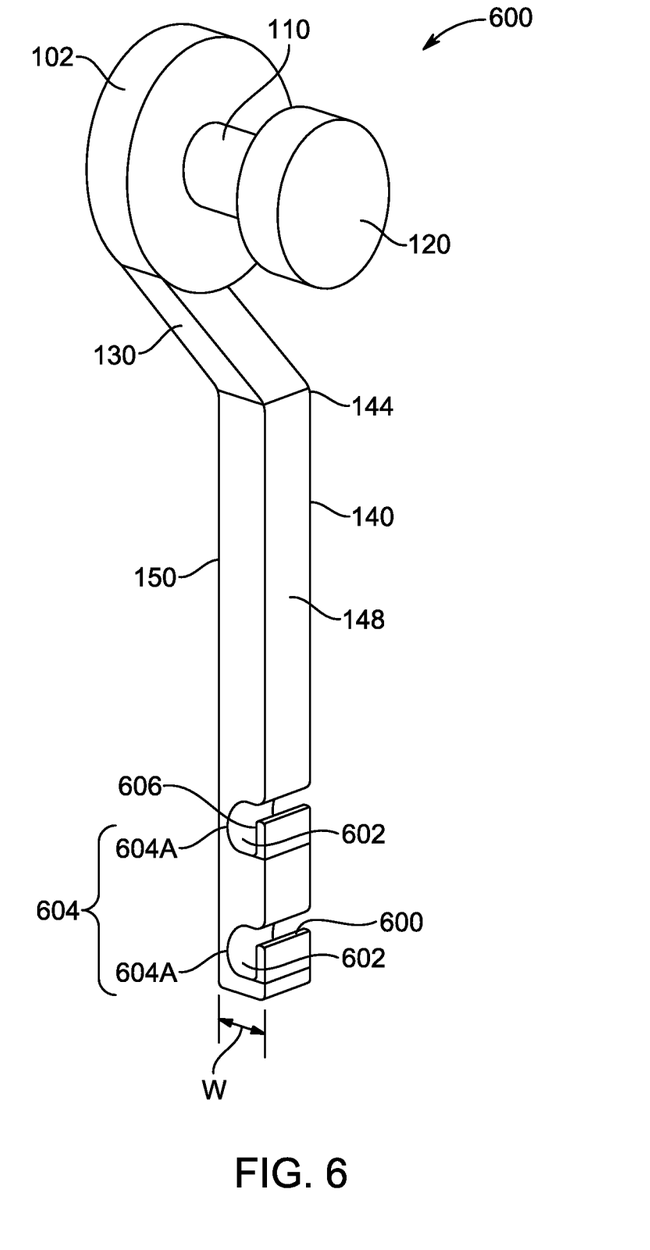
FIG. 6 is a perspective view of an orthodontic band attachment device illustrating band attachment indentations, according to certain embodiments.

Referring to FIG. 6, a perspective view of an orthodontic band attachment device 600 showing band attachment indentations 602 is described, according to certain embodiments. The orthodontic band attachment device 600 includes the base 102, the button structure 120, and the button support column 110 connecting the base 102 and the button structure 120 as described above. The orthodontic band attachment device 600 further includes the hook arm 140, and the hook arm attachment member 130 connecting the hook arm 140 with the base 102 as described above. The hook arm 140 includes one or more band attachment structures 604 arranged along the hook arm length 11' and has the hook arm outer surface 148 and the hook arm inner surface 150. As shown in FIG. 6, the hook arm 140 includes two band attachment structures such as a first band attachment structure 604A and a second band attachment structure 604B. The first band attachment structure 604A and the second band attachment structure 604B are collectively referred to as 'the band attachment structures 604' and individually referred to as 'the band attachment structure 604', unless otherwise specifically mentioned. The first band attachment structure 604A is located at the first distance 'd1' from the first arm end 144 of the hook arm 140 and the second band attachment structure 604B is located at the second distance 'd2' from the first band attachment structure 604A.

The band attachment structure 604 includes the band attachment indentation 602 extending into the hook arm 140 which defines a band attachment gap. The band attachment indentation 602 may be otherwise known as a cutout or a groove defined at the hook arm outer surface 148 and extends towards the hook arm inner surface 150. In FIG. 6, the band attachment indentation 602 is shown oriented substantially perpendicular to a plane defined by the hook arm outer surface 148 and extends along a hook arm width 'W' defined between the hook arm outer surface 148 and the hook arm inner surface 150. This orientation of the indentation 602 may be referred as a "front indentation" embodiment. In some embodiments, the band attachment indentation 602 can be oriented substantially perpendicular to a plane defined by the hook arm side surface 140. This orientation of the indentation 602 may be referred as a "side indentation" embodiment. The band attachment indentation 602 has an indentation depth less than the hook arm width 'W'. In an embodiment, the band attachment indentation 602 extends no further than 75% of the hook arm width 'W'. In other words, the indentation depth is equal to or less than 75% of the hook arm width 'W'. In some embodiments, the band attachment indentation 602 extends no further than 70% of the hook arm width 'W', preferably 65% of the hook arm width 'W', preferably 60% of the hook arm width 'W', preferably 55% of the hook arm width 'W', and preferably 50% of the hook arm width 'W'.

The band attachment indentation 602 further includes a band securing projection 606 extends from a top edge of the band attachment indentation 602 in a direction towards the button structure 120 along the hook arm outer surface 148. The band securing projection 606 is substantially coplanar with a side surface of the hook arm 140. The band securing projection 606 partially close an opening of the band attachment indentation 602 and acts as a stopper or locking mechanisms to prevent the orthodontic band from slipping out of the band attachment indentation 602. The band securing projection 606 may further help in positioning the orthodontic band within the band attachment indentation 602 intact. In one embodiment, the band securing projection 606 may be formed integral with the band attachment indentation 602. In some embodiments, the band securing projection 606 may be separately and detachably attached to the band attachment indentation 602. In some embodiments, a cross-section of the band attachment indentation 602 may be rectangular, oval, circular, or any other known polygon shape as described above.

With the orthodontic attachment device 100, 500, 600 of the present disclosure, additional inventory expenses which otherwise incurred for maintaining the buttons and hooks separately may be eliminated. Further, the orthodontic band attachment devices 100, 500, 600 provide an efficient and cost effective system to get the full benefits of button and hook at the same time and can be placed facially and lingually as per the orthodontic procedure requirements. The orthodontic attachment devices 100, 500, 600 further simplify orthodontic procedure and mechanics by allowing versatility to orthodontic elastic configuration, facilitate easy maintenance, and reduce irritation to gingival tissues.

The orthodontic attachment device 100, 500, 600 of the present disclosure can form a component of an orthodontic system. The orthodontic system can further comprise biasing members such as springs or elastic bands which can be reversibly attached to the orthodontic attachment device.

Various embodiments of the present disclosure are described with reference to FIG. 1 through FIG. 6. The embodiments describe the orthodontic band attachment device 100 comprising the base 102 comprising the tooth interfacing surface 104 and the outer base surface 106; the button support column 110 attached to the outer base surface 106 at the substantially central location, the button support column 110 having the button support column diameter 'D2' which is smaller than the outer base surface size and the button support column height 'H'; the button structure 120 having the button structure diameter 'D3' which is greater than the button support column diameter 'D2', the outer button surface 122 which is substantially parallel to the outer base surface 106, and the inner button surface 124 which is attached to the button support column 110 such that the inner button surface 124 is separated from the outer base surface 106 by the button support column height 'H'; the hook arm attachment member 130 attached to the base 102 at the substantially peripheral location; the hook arm 140 comprising one or more band attachment structures 130 arranged along the hook arm length 'L1' and having the hook arm outer surface 148 and the hook arm inner surface 150, wherein the hook arm attachment member 130 is oriented such that the hook arm outer surface 148 is substantially coplanar with the outer button surface 122 and the orthodontic band is able to pass between the hook arm attachment member 130 and the button structure 120.

In the orthodontic band attachment device 100, the tooth interfacing surface 104 is concave.

In the orthodontic band attachment device 100, the tooth interfacing surface 104 is contoured to interface securely with the tooth surface.

In the orthodontic band attachment device 100, the tooth interfacing surface 104 has an adhesive accommodating texture 402.

In the orthodontic band attachment device 100, the base 102 is substantially circular. In the orthodontic band attachment device 100, the button structure diameter 'D3' is greater than the button support column diameter 'D2' so as to create the button overhang distance 'C' of at least 0.25 mm.

In the orthodontic band attachment device 100, the button support column height 'H' is at least 0.5 mm.

In the orthodontic band attachment device 100, the hook arm attachment member 130 is oriented at the hook arm attachment member angle 'A1' of 30 to 60 degrees with respect to the outer base surface 106.

In the orthodontic band attachment device 100, the hook arm 140 is oriented at the hook arm angle 'A2' of 30 to 60 degrees with respect to the hook arm attachment member 130.

In the orthodontic band attachment device 100, the band attachment structure 142 comprises the band attachment projection 302, the band attachment projection 302 having the band attachment projection inner surface 308 and the band attachment projection outer surface 310.

In the orthodontic band attachment device 100, the band attachment projection 302 is oriented substantially perpendicular to the hook arm 140 and substantially coplanar with the outer button surface 122 and the hook arm outer surface 148.

In the orthodontic band attachment device 500, the band attachment projection 302 further comprises the band securing projection 502 attached to the band attachment projection 302 at the location distal to the hook arm 140 and which extends in the direction toward the button structure 120.

In the orthodontic band attachment device 500, the band securing projection 502 is oriented substantially parallel to the hook arm.

In the orthodontic band attachment device 600, the band attachment structure 604 comprises the band attachment indentation 602 extending into the hook arm 140 which defines the band attachment gap.

In the orthodontic band attachment device 600, the band attachment indentation 602 is oriented substantially perpendicular to the hook arm 140 and extends no further than 75% of a hook arm width 'W'.

In the orthodontic band attachment device 600, the band attachment indentation 602 further comprises the band securing projections 606 which is substantially coplanar with the side surface 152, 154 of the hook arm 140 and which extends in the direction toward the button structure 120.

In the orthodontic band attachment device 100, the outer button surface 122 and the hook arm outer surface 148 are convex.

In the orthodontic band attachment device 100, the band attachment projection outer surface 310 is convex.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An orthodontic band attachment device, comprising:
a base comprising a tooth interfacing surface and an outer base surface;
a button support column attached to the outer base surface at a substantially central location, the button support column having a button support column diameter which is smaller than an outer base surface size and a button support column height;
a button structure having a button structure diameter which is greater than the button support column diameter, an outer button surface which is substantially parallel to the outer base surface, and an inner button surface which is attached to the button support column such that the inner button surface is separated from the outer base surface by the button support column height;
a hook arm attachment member attached to the base at a substantially peripheral location;
a hook arm comprising one or more band attachment structures arranged along a hook arm length and having a hook arm outer surface and a hook arm inner surface,
wherein the hook arm attachment member is oriented such that the hook arm outer surface is substantially coplanar with the outer button surface and an orthodontic band is able to pass between the hook arm attachment member and the button structure.

2. The orthodontic band attachment device of claim 1, wherein the tooth interfacing surface is concave.

3. The orthodontic band attachment device of claim 2, wherein the tooth interfacing surface is contoured to interface securely with a tooth surface.

4. The orthodontic band attachment device of claim 1, wherein the tooth interfacing surface has an adhesive accommodating texture.

5. The orthodontic band attachment device of claim 1, wherein the base is substantially circular.

6. The orthodontic band attachment device of claim 1, wherein the button structure diameter is greater than the button support column diameter so as to create a button overhang distance of at least 0.25 mm.

7. The orthodontic band attachment device of claim 1, wherein the button support column height is at least 0.5 mm.

8. The orthodontic band attachment device of claim 1, wherein the hook arm attachment member is oriented at a hook arm attachment member angle of 30 to 60 degrees with respect to the outer base surface.

9. The orthodontic band attachment device of claim 8, wherein the hook arm is oriented at a hook arm angle of 30 to 60 degrees with respect to the hook arm attachment member.

10. The orthodontic band attachment device of claim 1, wherein the band attachment structure comprises a band attachment projection, the band attachment projection having a band attachment projection inner surface and a band attachment projection outer surface.

11. The orthodontic band attachment device of claim 10, wherein the band attachment projection is oriented substantially perpendicular to the hook arm and substantially coplanar with the outer button surface and the hook arm outer surface.

12. The orthodontic band attachment device of claim 11, wherein the band attachment projection further comprises a band securing projection attached to the band attachment projection at a location distal to the hook arm and which extends in a direction toward the button structure.

13. The orthodontic band attachment device of claim 12, wherein the band securing projection is oriented substantially parallel to the hook arm.

14. The orthodontic band attachment device of claim 1, wherein the band attachment structure comprises a band attachment indentation extending into the hook arm which defines a band attachment gap.

15. The orthodontic band attachment device of claim 14, wherein the band attachment indentation is oriented substantially perpendicular to the hook arm and extends no further than 75% of a hook arm width.

16. The orthodontic band attachment device of claim 15, wherein the band attachment indentation further comprises a band securing projections which is substantially coplanar with a side surface of the hook arm and which extends in a direction toward the button structure.

17. The orthodontic band attachment device of claim 1, wherein outer button surface and the hook arm outer surface are convex.

18. The orthodontic band attachment device of claim 10, wherein the band attachment projection outer surface is convex.

* * * * *